Nov. 1, 1949  P. H. WILLIAMS  2,486,899
BALANCING VALVE
Filed Oct. 9, 1946
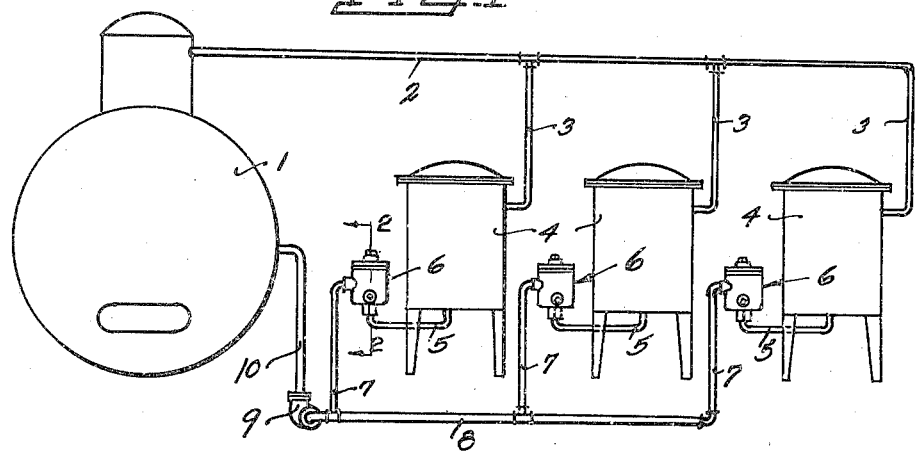
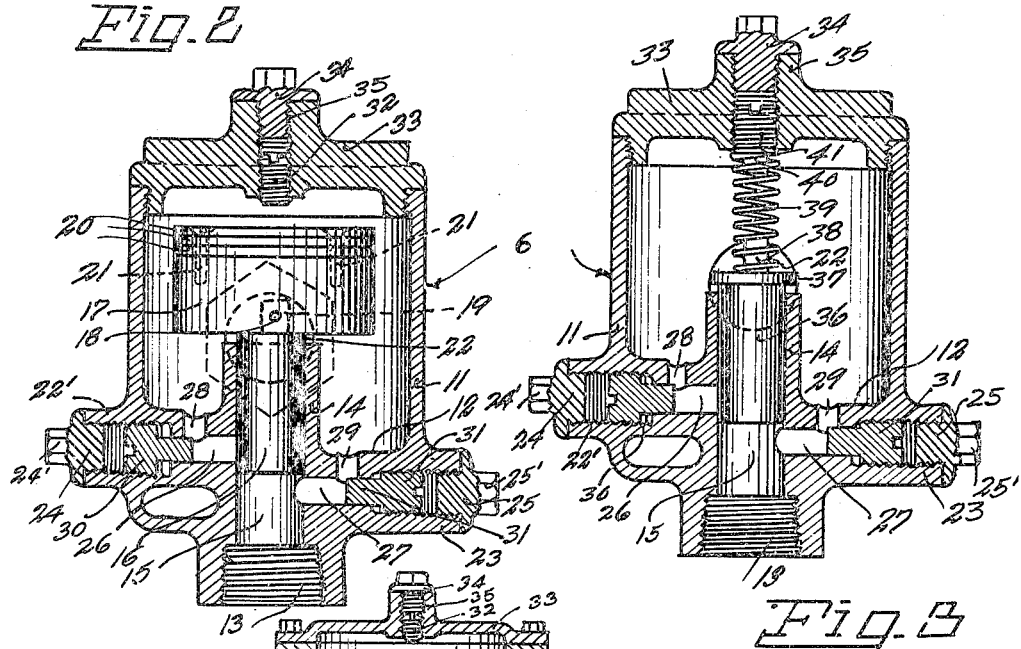
Inventor
Philip H. Williams
Glenn L. Fish
Attorney Patented Nov. 1, 1949

2,486,899

UNITED STATES PATENT OFFICE 2,486,899

BALANCING VALVE

Philip H. Williams, San Jose, Calif., assignor to E. A. Kent, Berkeley, Calif.

Application October 9, 1946, Serial No. 702,170

3 Claims. (Cl. 137—53)

This invention relates to differential balancing valves to maintain a uniform pressure differential through all machines of a series where steam is used for heating or processing and where condensate returns from all machines through a common return line.

In such systems it has been found that higher temperatures and higher efficiencies are possible by returning the condensate to the boiler at temperatures far above the atmospheric flash point. Such systems must be what are known as "closed return systems" in which the return lines are closed and operate at high pressure instead of being vented to the atmosphere and permitted to drop to approximately atmospheric pressure in the return lines.

Inherent in such systems is a tendency to "short circuit" some of the machines so that one or more machines of a series will draw all or most of the supply steam while other machines become cold, fill with undrained condensate and are rendered inefficient or useless. The usual practice is to install small orifices at the outlet of each machine to restrict the flow of condensate and force steam through machines of the series that otherwise would be sluggish in circulation or completely short circuited. It has been found that the efficiency of this expedient is low and its effectiveness not uniform or satisfactory. If the fixed orifices are small enough to control the load at minimum capacity they will prove too small for maximum load, and vice versa.

It is, therefore, the object of the present invention to correct this condition and provide an efficient means for regulation of the steam consumption and drainage of all the machines in a series.

Another object of the invention is to provide effective means for maintaining a uniform pressure differential or drop between the steam supply line and the return line of a series of steam heated machines.

Another object of the invention is to provide efficient means for adjusting the flow of steam to each machine of such series irrespective of the conditions existing at other machines of the series and without disturbing the efficient working of such other machines.

Another object of the invention is to provide such means for such purpose as shall be fully automatic in action, responsive to changes in steam pressure and that will operate over long periods without attention.

Another object of the invention is to provide such means for such purpose as shall be self-clearing of scale, rust and other foreign matter which may enter the steam lines and form obstructions therein.

And still another object of the invention is to provide such means for such purpose as shall constitute a drainage means which will shorten the warming-up time required to bring cold machines to working temperature by increasing the flow of condensate from such machines in adverse ratio to their rise in temperature.

In the accompanying drawings:

Fig. 1 is a diagrammatic view of the apparatus,

Fig. 2 is a sectional view on the line 2—2 of Fig. 1.

Fig. 3 is a sectional view of a modified construction, showing a spring instead of a weight.

Fig. 4 is a sectional view of a modified form showing weights arranged in offset compartments.

In the accompanying drawings, the numeral 1 indicates a boiler for generating steam which flows through the pipe line 2 and branch pipes 3 to machines 4 which may be cookers or any other machines wherein steam is employed for heating or processing material. A pipe 5 extends from the bottom of each machine to a balancing valve 6 which is of an improved construction, and from the balancing valve condensate is delivered through pipes 7 to a pipe line 8, which may be termed a return line and leads to a pump 9 having communication with the boiler 1 through a pipe 10.

The balancing valves are of duplicate construction and one is shown on an enlarged scale in vertical section in Fig. 2. Referring to Fig. 2, it will be seen that each valve has a casing 11 of appropriate depth and diameter. The casing has a bottom 12 formed with a depending socket 13 to receive the pipe 5 with which the valve is connected. A guide sleeve 14 extends vertically in the casing alinement with the inlet socket 13 and communicates therewith through the bore 15. A valve 16 operates in the guide sleeve and is suspended from a weight 17 which is formed of heavy metal and rests upon the upper end of the sleeve when in closed position. A pin 18 passes transversely through a shank or stem 19 projecting from the upper end of the valve into the weight and connects the valve with the weight. Supplemental weights 20, consisting of thin metal disks, rest upon the upper end of the weight 17 where they are secured by removable screws 21 and it will be understood that by applying or removing supplemental weights, the effectiveness of the weight may be controlled and the amount of pressure necessary to open the valve controlled. The outlet 22 of the casing with which pipe 7 connects, is located approximately midway the depth of the casing and in such relation to the upper end of the sleeve that fluid in the casing may readily flow out through the outlet.

At opposite sides of the casing are sockets 22' and 23 normally closed by plugs 24 and 25 which are screwed into their outer end portions and have wrench-engaging portions 24' and 25' at their outer ends. Bores or passages 26 and 27 connected the sockets with the bore 15 of the sleeve in vertical offset relation to each other and from these passages extend ports 28 and 29 which connect them with the interior of the casing. Valve members 30 and 31 are screwed into the sockets 22' and 23 to control flow of steam upwardly through the ports 28 and 29 and these valve members have grooves or eyes in their outer ends so that when the plugs 24 and 25 are removed the valve members may be adjusted and the extent to which their reduced inner end portions are disposed in blocking relation to the ports 28 and 29 may thereby be controlled. Attention is now called to the fact that the length of the valve 16 is such that its lower end is at all times disposed above the passage 27 but in blocking relation to the passage 26 when the valve is in its closed position. Therefore, when steam at low pressure enters the bore or passage 15 and the upper end of the sleeve is closed by the weight 17, a certain amount of steam may flow through the passage 27 and the port 29 into the casing 11 and out through the pipe 7. The fact that the valve 16 blocks passage 26 when it is closed prevents free flow of steam through passage 26 but, as the pressure increases and valve 16 is shifted upwardly, causes a gradual movement of the valve out of blocking relation to the passage 26. As the valve moves upwardly, the passage 26 is gradually unobstructed and increased flow of steam through the passage 26 and its port 28 is permitted until a maximum flow of steam is attained.

The operation of the invention is as follows:

Assume that the return pump has not been started and that return lines are full to the point where the pressure differential through the valve case is small. Then, in that case, the valve member 16 will be held in the lowest position of its travel by the weight 17 overcoming the differential pressure. Condensate will flow, under action of the low differential of pressure, into the valve case through the inlet 13, up through the bore 15, and out at passage 27 and port 29 in a quantity determined by the differential of pressure and the setting of the adjusting screw 31 and opening of port 29. Passage 26 being fully covered, no condensate will flow through port 26 and the valve will be operating in what is termed the "position of minimum flow." Note that such minimum rate of flow may be varied by setting of the adjusting screw 30.

Now assume the return pump is started and the pressure in return line drops or, in other words, the pressure differential through valve case 11 increases. Then, when such differential becomes such that the pressure of entering condensate on the area of the lower face of the valve member 16 is sufficient to counteract the opposing pressure in the return line plus the weight 17, the valve will be in equilibrium. Any increase in the entering pressure or decrease in the discharge pressure, that is, any increase in the differential of pressure through the valve case 11, will tend to raise valve member 16 and its weight 17 and uncover, or partially uncover, passage 26 leading to port 28 and permit condensate to flow out at port 28 as well as out at port 29. As the differential of pressure continues to increase, the valve member 16 and weight 17 will be lifted further and passage 26 will be further opened until the travel of the valve 16 and its weight 17 are stopped by engagement of the weight with the adjusting screw 32 in closure 33. A slug 34 forms a tight seal for the upper end of the opening 35 in which the screw is inserted. Any drop in the differential of pressure will operate to reverse the cycle and close the passage 26, thus restricting flow through port 28. Note that the capacity of port 28 is determined by setting of adjusting screw 30 and that with valve member 16 in position of highest travel, the valve is in position for what is termed "maximum flow position."

Should the machine drained by the valve under consideration tend to draw more than its portion of live steam, the increased flow of condensate through port 28 will tend to lower the differential of pressure through case 11, cause valve member 16 to drop, and so restrict the flow to normal. Should another machine or the series tend to short circuit and to discharge more than its pro-rata of condensate, then, in that case, the live steam pressure on the first machine considered will increase the pressure against the lower area of valve member 16 and lift it from its seat and restore the normal flow through port 28.

One more feature of the operation of the invention should be noted. When cold condensate is flowing through the system the return pump will create a high differential of pressure and speed up the drainage of the system. But, as the temperature of the condensate rises to near the point where steam will form, any further drop in pressure will tend to cause steam to form and the increased volume of steam, compared to the small volume of water, will fill the return lines and tend to prevent the formation of a high pressure differential, in consideration of this it will be clear that the capacity of the system and of individual valves will increase with lowered temperature and decrease as the temperature nears the steam forming point under the given pressure. This element in the invention makes for rapid drainage when the lines are cold and close regulation when the lines are at operating temperature.

Inasmuch as the temperature of a given machine is determined by the quantity and quality of steam flowing through it, and as adjustable ports 29 and 28 determine the minimum and maximum quantity of steam passing through the machine and the balancing action of the valve as described maintains a close balance of pressure differential it is clear that any desired temperature at any machine of the series may be maintained irrespective of conditions and temperatures at other machines.

As condensate enters vertically from the bottom of the valve case 11, it is clear that any scale, rust or obstruction in the return lines will drop down into the piping below valve case 11 and that the device will be self-clearing of such obstructions and foreign matter.

In Fig. 3 there has been illustrated a balancing valve of a modified construction. Most of its elements of construction are of the same construction as the valve illustrated in Fig. 2 and have been designated by the same reference numerals. The main difference in construction between Figs. 2 and 3 is in the valve member which operates in the sleeve 14, and, referring to Fig. 3, it will be seen that the valve member 36, which takes the place of valve member 16, has a head or flange 37 at its upper end which rests upon the upper end of sleeve 14 when the valve member is in closed position. A stud 38 projects upwardly from the headed upper end of the valve member 36 and fits within the lower end of a helical spring 39 which has its upper end fitting about the stud 40 at the lower end of screw 41. This screw takes the places of the screw 32 and it will be understood that by adjusting the screw, tension of the spring may be regulated and the amount of pressure necessary to raise the valve member 36 controlled. It is not necessary to describe the operation of this form of balancing valve as it is the same as that illustrated in Fig. 2.

In Fig. 4, there has been shown a balancing valve which is of the same construction except that there has been provided a modified embodiment of weights for yieldably resisting opening movement of the valve member. This valve member or plunger 42 is of greater length than the valve members 16 or 36 and projects upwardly from the sleeve 14 quite a distance. The casing 43 is also of increased height and has its upper portion progressively increased in diameter to provide annular shoulders 44 and 45 spaced from each other vertically of the casing. A weight 46 is mounted in fixed position about plunger 42 by a pin 47 and yieldably resists opening movement of the plunger. Additional weights 48 and 49 fit loosely in the enlarged upper portion of the casing and are formed at their centers with openings 50 and 51 of sufficient size to loosely accommodate the plunger and allow the plunger to have vertical movement independent of the two discs 48 and 49. When the valve plunger is shifted upwardly by pressure against its lower end, upward movement will first be resisted solely by the weight 46. When the weight or disk 46 engages the disk 48, it carries disk 48 upwardly with it and when disk 48 engages disk 49, the disks 48 and 49 will both be carried upwardly with disk 46. Therefore, weight applied to the plunger will be intermittently and progressively increased as pressure against the lower end of the plunger is built up.

In some food processes, for example, the cooking down of tomato juice to form tomato paste or catsup, the range of pressure differential between steam and return lines is very high. During the initial stages of cooking, while the vat is filled with several hundred gallons of cold juice, the temperature of the returning condensate will be low and permit of a very high differential. As cooking progresses and the temperature in the cooking vats rises and the paste thickens, the heat transfer slows up and the differential pressure or pressure differential between steam and return lines decreases.

Perfect differential regulation then requires provision for close balancing at high pressure differential and, during same operation, equally close differential balancing at lower differentials between steam aand return lines.

With single weight set to, say, five pounds differential, that is, set to open full port at five pounds, a pressure differential of five pounds will give a full port opening and the balancing action of the valve will not again become active until the differential falls to five or below five pounds. Meanwhile, the port will be wide open in all coils of the series.

When a number of independent disks or weights are provided, as shown in Fig. 4, the valve may be designed to open one-third port at five pounds differential in opposition to action of weight 46, another one-third opening at eight pounds differential in oppostion to action of weight 48, and a final one-third opening at increased differential in opposition to action of weight 49.

It will be evident that any number of disks or weights may be provided in keeping with the use to which the valve is to be put. By changing the location of the shoulders and thickness of the disks, the distance between the disks may be varied and the time intervals between engagement of the disks controlled.

Having thus described the invention, what I claim is:

1. In a pressure differential balancing valve, a valve casing having an inlet and an outlet, a valve guide extending inwardly of said valve casing from said inlet and having a bore therein, a slidable valve member positioned in said valve guide bore and having a weighted portion, means for limiting vertical travel of said valve member, a passage located below the path of travel of said valve member and communicating with the bore of said valve guide and the interior of said valve casing, an adjustable screw through said valve casing so positioned as to vary the area of the communicating passage, means for adjusting said adjusting screw from the outside of the valve casing, means for sealing said adjusting screw against leakage through the valve casing, a second communicating passageway communicating with the interior of the valve guide bore and the interior of said valve casing located intermediate the travel limits of said slidable valve member and closed thereby when the slide is in its lowered position and adapated to be fully uncovered when the valve member is in extreme upward position of its travel and fully covered when the valve member is in the lower extreme position of its travel, an adjusting screw so positioned in the second communicating passage as to vary the area of said passage when shifted longitudinally therein, means for adjusting said second mentioned screw from outside the valve casing, means for sealing said second mentioned adjusting screw against leakage through the valve casing, and means for connecting the valve casing into a condensate return line.

2. In a pressure differential valve, a casing having inlet and outlet connections, a valve guide extending upward centrally of said casing from the inlet connection, a slidable valve member in said valve guide having a weighted portion, a communicating passage between said valve guide and the interior of said casing located below the lower end of the valve member and at all times open, an adjusting screw in said communicating passage for varying the effective area of the communicating passage, means for adjusting said screw from outside said casing, means for sealing said operating means against leakage, a second communicating passage spaced upwardly from the first communicating passage and normally, closed by the lower portion of the valve member and gradually uncovered by upward movement of the valve member, means for adjusting the area of the second passage, communicating means for sealing the second communicating passage, and means for connecting the valve case into a condensate return line.

3. In a pressure differential valve, a casing having inlet and outlet connections, a valve guide extending upwardly from the inlet connection centrally of the casing, a slidable valve member in said valve guide having a weighted portion, a communicating passage between said valve guide and the interior of said casing located below the lower end of the valve member at all times, an adjusting screw for varying the effective area of said communicating passage, means for adjusting said screw from outside said casing, means for sealing said screw adjusting means against leakage exterior to the casing, a second communicating passage positioned above the first passage and closed by the slidable valve member when the said slidable valve member is in a lower position, means for adjusting the effective area of the second passage, means for sealing the last mentioned means against leakage exterior to said casing, and means for connecting said casing into a condensate return line.

PHILIP H. WILLIAMS.

REFERENCES CITED

The following references are of record in the file of this patent:

UNITED STATES PATENTS

| Number | Name | Date |
| --- | --- | --- |
| 9,321 | Guthrie | Oct. 12, 1852 |
| 458,891 | Fisher | Sept. 1, 1891 |
| 588,779 | Reinach | Aug. 24, 1897 |
| 595,190 | Miller | Dec. 7, 1897 |
| 803,189 | Palmer | Oct. 31, 1905 |
| 2,038,289 | Herbster | Aug. 21, 1936 |